Nov. 28, 1939.                D. FARR                 2,181,655

PROCESS OF PRODUCING AN EDIBLE PRODUCT

Original Filed May 15, 1933     2 Sheets-Sheet 1

Dexter Farr, Inventor

By Ogle R. Singleton, Attorney

Nov. 28, 1939.                    D. FARR                    2,181,655
                    PROCESS OF PRODUCING AN EDIBLE PRODUCT
                    Original Filed May 15, 1933    2 Sheets-Sheet 2
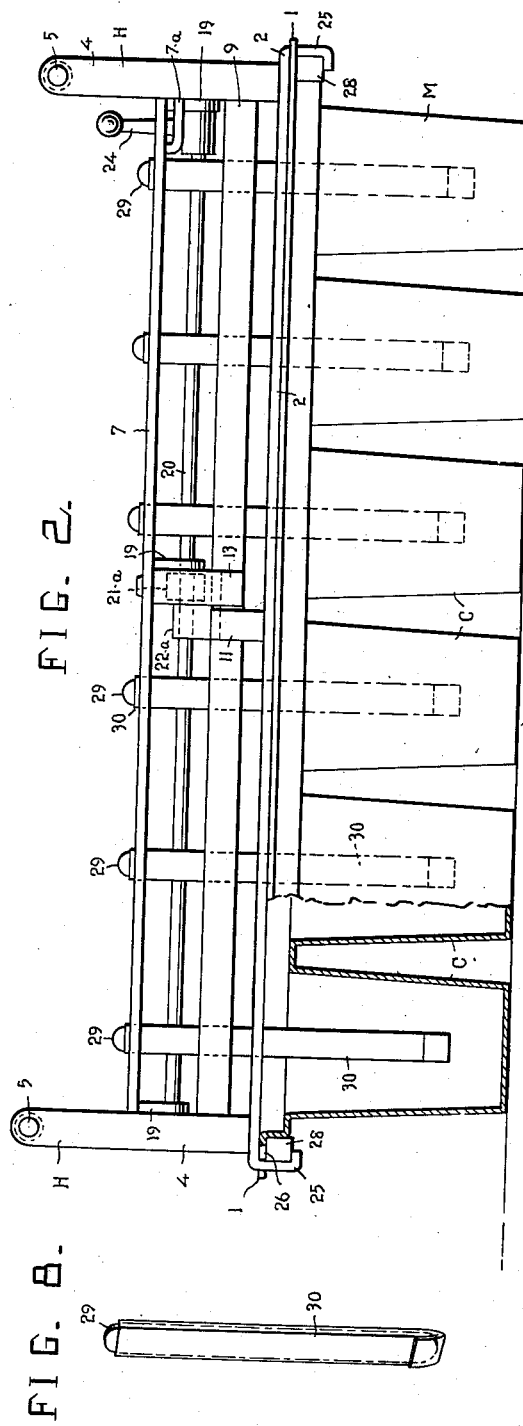
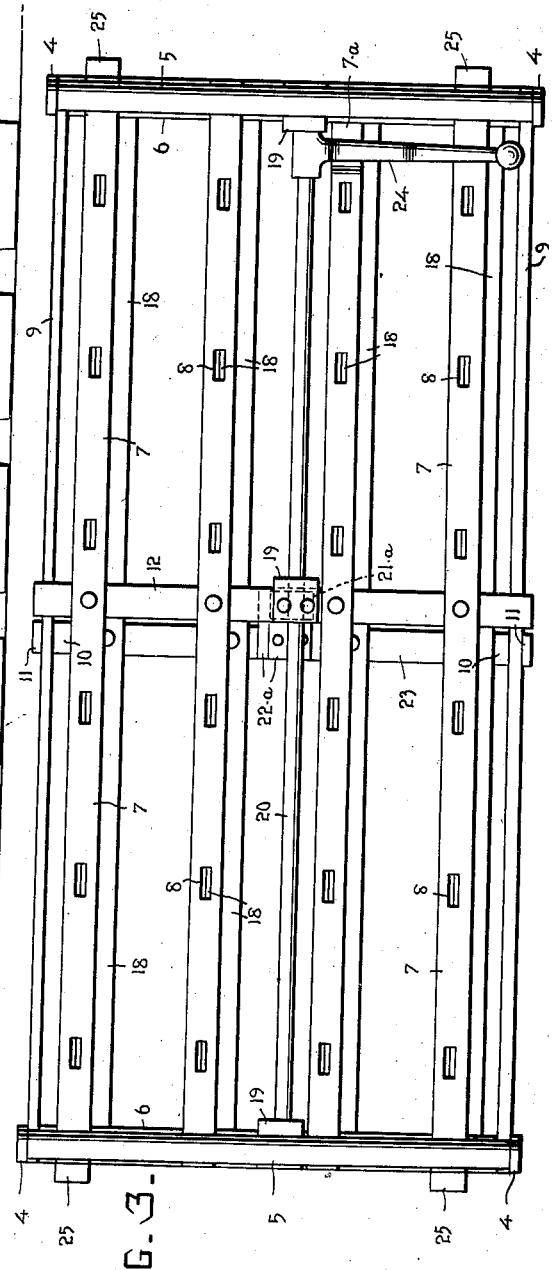
Inventor
Dexter Farr
By Ogle R. Singleton
Attorney Patented Nov. 28, 1939

2,181,655

UNITED STATES PATENT OFFICE 2,181,655

PROCESS OF PRODUCING AN EDIBLE PRODUCT

Dexter Farr, Ogden, Utah

Original application May 15, 1933, Serial No. 671,237. Divided and this application June 3, 1936, Serial No. 83,367

4 Claims. (Cl. 107—54)

My invention consists in a new and useful improvement in the process of producing an edible product and is designed particularly for the purpose of manufacturing a frozen product provided with an envelope or casing embedded therein and containing a handle by which the product may be manipulated during its dispensing and consumption. This application is a divisional application from my co-pending application Serial Number 671,237, filed on May 15, 1933, which matured Oct. 20, 1936, as Patent No. 2,057,941, in which I have described and claimed my improved apparatus by which my improved process, described and claimed herein, may be practiced.

I am aware that it is old to make an edible product, such as a block of ice cream, with a handle inserted therein, but I claim as a novel feature of my invention the provision of an envelope frozen in the product and a handle in such envelope which can be withdrawn therefrom as desired. By my improved process, I can so produce the edible product that the envelope or casing with the handle therein inserted is frozen in the product in such a way that the handle can be withdrawn from the casing and can be re-inserted as may be desired. The particularly novel and useful feature of my improved process is the positioning of the casing containing the handle in proper relation to the uncongealed mass of the product so that, when the mass is frozen, the casing will be enclosed in the mass, its open end protruding therefrom, and the handle in the casing will extend therefrom, and be freely removable therefrom. It must be especially noted that by my improved process the casing is fixed in the frozen mass but the handle within the casing remains unfixed and free to be removed. This important feature, viz. the removability of the handle is essential to the sales-promotion plan by which certain handles bear suitable indicia to indicate that the purchasers thereof are entitled to a prize. By this plan, the dealer dispensing the product, and the purchaser before consuming the product may remove the handle to examine it to ascertain whether the handle bears the indicia to entitle the purchaser to a prize, and can then return the handle to the ice cream block for use while consuming the block. It is also obvious that my improved process makes it possible for the handles to be removed to facilitate shipping the product.

In order to fully disclose my improved process, I have illustrated in the drawings filed herewith and have hereinafter fully described my improved apparatus by which my improved process may be practiced, but it is to be distinctly understood that I do not consider my improved process to be limited by said illustration and description but refer for its scope to the claims appended hereto.

In the drawings:

Fig. 2 is a side elevation of my apparatus.

Fig. 3 is a top plan view of the handle holder.

Fig. 8 is a perspective view of a casing and handle.

Figure 1:
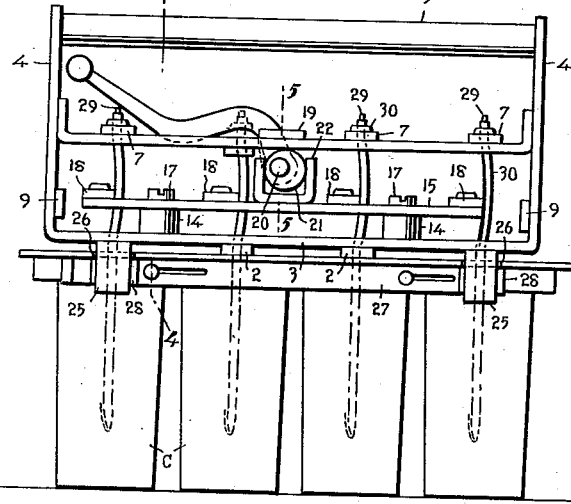
Fig. 1 is an end elevation of my apparatus.
Figure 6:
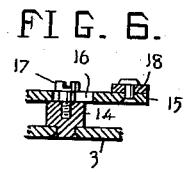
Fig. 6 is a vertical section on line 6—6 of Fig. 4.

As illustrated in the drawings, my apparatus comprises the mould member M and the casing and handle holder H, the former being rectangular in shape with any desired number and arrangement of mould cups C (twenty-four, in four sets of six each, being illustrated). The member M is provided with the circumferential flange 1. The holder H has a series of four longitudinal plates 2, each for one set of cups C. These plates 2 are secured and properly spaced by transverse plates 3, one at each end of the holder H. These plates 3 have at their ends the upright arms 4 connected by the handles 5. Suitably disposed between the arms 4 and in vertical alignment with the plates 3 are the transverse plates 6 on which are carried the longitudinal plates 7 arranged in a series of four to correspond with the plates 2 and in vertical alignment therewith. The plates 2 and 7 are provided with aligned slots 8 so disposed that each pair of slots of 8 is positioned over the center of one of the cups C. The arms 4 are provided with the longitudinal side bracing bars 9. Midway between the plates 3, there is the transverse bracing plate 10 attached above the longitudinal lower plates 2 and having the upstanding ears 11 on its ends attached to the plates 9. The transverse bracing plate 12 is disposed beneath and attached to the longitudinal upper plates 7 and has the depending ears 13 attached to the plates 9.

Suitably mounted upon the plates 3 are the blocks 14 on which are the transverse slides 15 having the slots 16 through which pass the headed pins 17 threaded into the blocks 14. Carried by the slides 15 are four longitudinal locking bars 18 corresponding with the four sets of pairs of slots 8, and so mounted that when the slides 15 are moved the bars 18 may be moved slightly within the lines of the slots 8.

Figure 4:
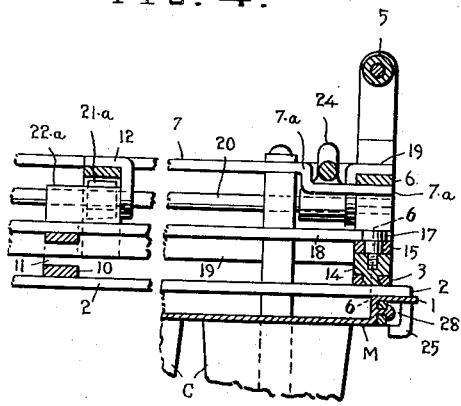
Fig. 4 is a fragmentary vertical section on the line 4—4 of Fig. 1.

Suitably mounted upon the plates 6 and the plate 12, are the depending bearings 19 in which is carried the reciprocable shaft 20 on which are carried the cam shoulders 21 in vertical alignment with the slides 15, which co-act with the forks 22 mounted on the slides 15. Midway between the slides 15 and in the same horizontal plane therewith, the brace plate 23 connects the locking bars 18, and has mounted thereon the fork 22a with which co-acts the cam shoulder 21a on the shaft 20. The shaft 20 is provided adjacent one of its bearings 19 with the operating crank handle 24. It is to be noted (Fig. 4) that the plate 7 adjacent the shaft 20 has its portion 7a bent downwardly and connected on the under side of the plate 6 to obviate interference with the movement of the crank handle 24 to reciprocate the shaft 20.

Each of the plates 2, on the sides of the holder H, is provided at each of its ends with a depending hook 25. These hooks 25 pass through slots 26 in the flange 1 of the member M which is provided on each end with slides 27 carrying bolts 28 to co-act with the hooks 25 to latch the holder H to the member M.

Figure 7:
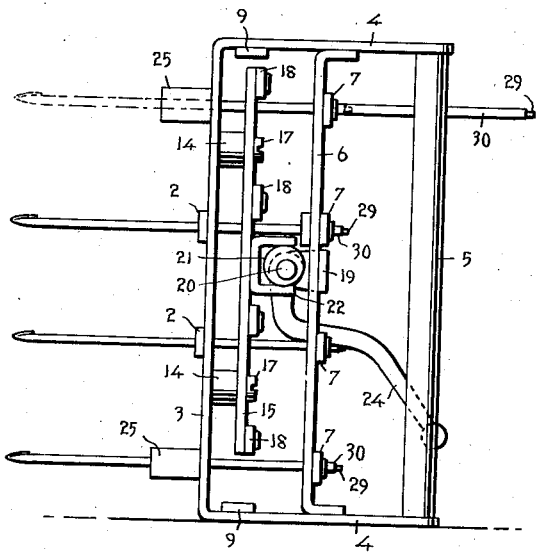
Fig. 7 is an end elevation of the holder turned on its side, for the insertion of the casings and handles.
Figure 5:
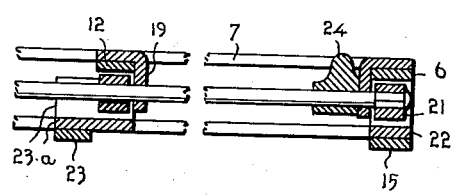
Fig. 5 is a fragmentary vertical section on the line 5—5 of Fig. 1.

From the foregoing description of my improved apparatus its use and operation in the practice of my improved process will be understood. The holder H is placed upon its side, as illustrated in Fig. 7, and it is then charged with the casings 30 containing the handles 29, in the slots 8. When the operating crank handle 24 is moved from the position illustrated in Fig. 7 to its position illustrated in Fig. 1, its associated mechanism causes the locking bars 18 to press the casings 30 and the handles 29 against the bars 2 and 7, thus fastening the casings 30 and handles 29 in properly adjusted position. The holder H is then applied to the mould member M, the cups C having been properly charged with the uncongealed mass to be frozen. Thus it is obvious that each casing 30 and its handle 29 is properly positioned in the mass in its cup C (Fig. 2). When the holder H has been locked upon the mould member M by means of the slides 27 and bolts 28, both the holder H and member M can be carried by the handles 5 to be placed in the freezing chamber. After the masses in the cups C have been properly frozen, and the apparatus has been removed from the freezing chamber, the slides 27 and bolts 28 are manipulated to release the holder H from the member M which has been sufficiently heated to free the frozen masses from the cups C, and when the holder H is raised by the handles 5, the masses are withdrawn from the cups C. When the crank handle 24 is manipulated to release the casings 30 and handles 29, and the holder H is raised, the frozen products pass out of the holder in completed form.

Having described my invention, what I claim is:

1. The process of producing an edible product which comprises charging a mould with a fluid edible substance, forming a cavity in said substance lined with a water-proof receptacle in which has been temporarily fastened a handle projecting outside of the open end of said receptacle, applying refrigeration to said substance thereby causing the substance to adhere to the outer surface of the receptacle which prevents contact of the substance with the handle, and removing the substance from the mould by means of the handle and the receptacle fastened thereto.

2. The process of producing an edible product which comprises charging a mould with a fluid edible substance, so disposing a stick in a receptacle that it extends outwardly from the receptacle and is rendered water-proof throughout its portion within the receptacle, placing said stick and receptacle in a holder member, clamping said receptacle to said stick and to said holder member, so disposing said holder member relative to said mould that the substance in the mould contacts the receptacle and does not contact the stick, fastening together the mould and holder member, moving the mould by means of the holder member into a refrigeration chamber, solidifying the substance by refrigeration, removing the mould and holder member from the chamber increasing the temperature of the mould, unfastening the holder member from the mould, removing the holder member from the mould thereby removing the solidified substance from the mould, releasing the receptacle and stick from the holder member, and moving the holder member thereby causing the finished product to pass therefrom.

3. The method of producing edible products which comprises charging a plurality of mould chambers in a unitary mould member with a fluid edible substance, so disposing a plurality of sticks in an equal number of receptacles so that each stick extends outwardly from its receptacle and is rendered water-proof throughout its portion within its receptacle, charging a holder member with said sticks, clamping said receptacles to said sticks and to said holder member, so disposing said holder member relative to said mould member that each receptacle is so received into the substance in one of the mould chambers that the said substance contacts the receptacle and does not contact the stick in the receptacle, fastening together the holder and mould members, moving the mould member by means of the holder member into a refrigeration chamber, solidifying the substance by refrigeration, removing the holder and mould members from the chamber, increasing the temperature of the mould member, unfastening the holder member from the mould member, removing the holder member from the mould member thereby removing the solidified substance from the mould chambers, releasing the receptacles and sticks from the holder member, and moving the holder member to cause the finished products to pass therefrom.

4. The process of producing an edible product which comprises charging a mould with a fluid edible substance, fastening a waterproof casing on a handle projecting from the open end of the casing, inserting the portion of the handle covered by the casing into the substance, applying refrigeration to said substance thereby causing the substance to adhere to the outer surface of the casing which prevents contact of the substance with the handle, removing the substance from the mould by means of the handle and the casing fastened thereto, unfastening the casing from the handle, and removing the handle from the casing embedded in and adhering to the frozen substance.

DEXTER FARR.